(12) United States Patent
Ishioka et al.

(10) Patent No.: US 7,313,170 B2
(45) Date of Patent: Dec. 25, 2007

(54) SPREAD SPECTRUM RECEIVER

(75) Inventors: Kazuaki Ishioka, Tokyo (JP);
Katsuyuki Motoyoshi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 632 days.

(21) Appl. No.: 10/487,941

(22) PCT Filed: Feb. 26, 2003

(86) PCT No.: PCT/JP03/02116

§ 371 (c)(1),
(2), (4) Date: Mar. 4, 2004

(87) PCT Pub. No.: WO04/001999

PCT Pub. Date: Dec. 31, 2003

(65) Prior Publication Data

US 2004/0247021 A1    Dec. 9, 2004

(30) Foreign Application Priority Data

Jun. 25, 2002    (JP) .............................. 2002-184821

(51) Int. Cl.
*H04B 1/00* (2006.01)

(52) U.S. Cl. ...................... 375/148; 375/140; 375/130; 375/144; 375/285; 375/343; 375/316; 375/355; 375/349; 375/147

(58) Field of Classification Search ................ 375/130, 375/144, 143, 147, 148, 152, 316, 285, 350, 375/355, 349, 346, 343, 140
See application file for complete search history.

(56) References Cited

U.S. PATENT DOCUMENTS

| 6,260,053 | B1 | 7/2001 | Maulik et al. |
| 6,993,099 | B2 * | 1/2006 | Zogakis et al. ............. 375/340 |
| 7,031,377 | B2 * | 4/2006 | Chen et al. ................. 375/152 |

FOREIGN PATENT DOCUMENTS

| JP | 4-299617 | 10/1992 |
| JP | 6-4072 | 1/1994 |
| JP | 10-173630 | 6/1998 |
| JP | 2994752 | 10/1999 |
| JP | 2000-244367 | 9/2000 |
| JP | 2000-269855 | 9/2000 |
| JP | 2002-164801 | 6/2002 |

* cited by examiner

*Primary Examiner*—David C. Payne
*Assistant Examiner*—Rahel Guarino
(74) *Attorney, Agent, or Firm*—Oblon, Spivak, McClelland, Maier & Neustadt, P.C.

(57) ABSTRACT

A signal generation/noise extraction unit that includes an analog-to-digital converter, a switch, a filter, a subtracter, an oscillator, a multiplier, and a switch generates a down-sampled signal at a frequency at which aliasing occurs, from an input signal, and extracts an aliasing noise component included in the down-sampled signal. A dispreading unit includes a (1/n)× over-sampling matched filter, a 1× over-sampling matched filter conducts dispreading processings to the down-sampled signal and the aliasing noise component. A noise canceling unit includes filters, a multiplier, an adder, and a switch combines two dispreading results, and cancels the aliasing noise component.

16 Claims, 10 Drawing Sheets

SPREAD SPECTRUM RECEIVER

TECHNICAL FIELD

The present invention relates to a receiver that can prevent characteristic deterioration caused by aliasing. More particularly, the present invention relates to a receiver that can realize low power consumption and circuit miniaturization even against occurrence of the aliasing.

BACKGROUND ART

FIG. 9 is a schematic diagram of a conventional spread spectrum receiver. A transmitter 201 includes a modulation unit 202, a spreading code generator 203, a multiplier 204, a spreading unit 205, a roll-off filter 206, a D/A converter 207, a frequency converting unit 208, and a transmission antenna 209. A receiver 211 includes a frequency converting unit 212, an A/D converter 213, a despreading unit 214, a demodulation unit 215, and a reception antenna 216.

In the transmitter 201, the modulation unit 202 performs a predetermined modulation processing to information to be transmitted and outputs a modulated signal. The multiplier 204 in the spreading unit 205 multiplies the modulated signal by a spreading code that is output from the spreading code generator 203, whereby the spreading unit 205 executes spectrum spreading to the modulated signal. The roll-off filter 206 performs waveform shaping to an output of the spreading unit 205 for band limitation. The D/A converter 207 converts the digital waveform-shaped signal to an analog signal. The frequency converting unit 208 converts frequency of the analog signal to RF signal and outputs a frequency-converted signal by way of the transmission antenna 209.

In the receiver 211, the frequency converting unit 212 converts the signal received via the reception antenna 216 to a baseband signal. The A/D converter 213 converts the analog baseband signal to a digital signal. The despreading unit 214 despreads the digital signal, and the demodulation unit 215 demodulates the despread digital signal.

FIG. 10 is a block diagram of the despreading unit 214. As shown in FIG. 10, a matched filter is often used in the despreading unit. The despreading unit includes a matched filter 221 and an interpolation unit 222. The matched filter 221 performs a correlation operation between the received signal and the reference signal (spreading code) and thereby despreads the received signal. The interpolation unit 222 interpolates a correlation output waveform from the matched filter 221 to thereby improve detection timing accuracy.

According to a sampling theory, if a signal having a band that is limited to W [Hz] is sampled at a sampling frequency that is higher than 2W [Hz], an original signal can be reproduced. If the signal is sampled at a sampling frequency that is lower than 2W [Hz], components at frequencies equal to or higher than W are converted back into a continuous time signal and an original signal cannot be reproduced accurately. This phenomenon is called "aliasing".

If a chip rate of the spreading code is R [Hz] and a roll-off factor of the roll-off filter 206 is a ($0 \leq \alpha \leq 1$), a frequency band of an output of the roll-off filter is expressed as $(1+\alpha)R/2$. In W-CDMA (Wideband-Code Division Multiple Access), for example, $\alpha=0.22$ is employed.

Therefore, according to the sampling theory, if a sampling rate of the A/D converter 213 is $(1+\alpha)R$ or higher, the original signal can be accurately reproduced. Normally, the sampling rate is set at an integer-multiple of the chip rate of the spreading code to facilitate circuit manufacturing. If characteristic deterioration is to be avoided, a sampling rate of 2R is often used. If circuit miniaturization has a priority, a sampling rate of R is often used.

For determining a sampling frequency of the matched filter circuit, there are following two options:

(1) To satisfy the sampling theory, over-sampling is performed at a frequency that is greater than twice the chip rate of the spreading code;

(2) Deterioration caused by aliasing is acceptable, then the sampling is performed at the same frequency as the chip rate of the spreading code.

If the sampling rate of the A/D converter is set to a frequency that is twice the chip rate of the spreading code, characteristic deterioration does not occur since the rate satisfies the sampling theory. However, since the chip rate is normally high, this sampling rate setting disadvantageously increases circuit scale and power consumption.

If the sampling rate of the A/D converter is set to a frequency that is equal to the chip rate, the circuit scale and power consumption can be reduced; however, aliasing disadvantageously causes the characteristic deterioration.

Attention is now paid to the frequency spectrum of the spread spectrum signal after passing through the roll-off filter. The frequency band of the spread spectrum signal after passing through the roll-off filter (roll-off factor $\alpha$) is $(1+\alpha)R/2$. According to the sampling theory, if a signal is sampled at a frequency that is higher than twice the frequency band, an original signal can be accurately reproduced. Therefore, the sampling frequency can be set to $R(1+\alpha)$.

At $a=0.22$, for example, if a signal is over-sampled at a frequency that is 1.25 times the chip rate, an original signal can be accurately reproduced without characteristic deterioration. Besides, an operation rate of the reception circuit can be set lower than that of two times over-sampling. Nevertheless, because of the odd over-sampling number of 1.25 times the original frequency, the matched filter must have multinary reference signals, which disadvantageously increases the circuit scale. As a result, although the operation rate can be decreased, both the circuit scale and the power consumption disadvantageously increase.

DISCLOSURE OF THE INVENTION

It is an object of the present invention to solve at least the problems in the conventional technology.

The receiver according to one aspect of the present invention includes a signal generating/noise extracting unit that generates, from an input signal, a down-sampled signal at a frequency at which aliasing occurs, and that extracts an aliasing noise component included in the down-sampled signal, a dispreading unit that despreads the down-sampled signal and the aliasing noise component, and a noise canceling unit that adds the down-sampled signal despread and the aliasing noise component despread to cancel the aliasing noise component.

The receiver according to another aspect of the present invention includes a signal generating/noise extracting unit that generates, from an input signal, a down-sampled signal at a frequencies at which aliasing occurs and that extracts an aliasing noise component included in the down-sampled signal, a storing unit that temporarily stores the down-sampled signal and the aliasing noise component, and a noise canceling unit that reads signals from the storing unit, adds the signals, and thereby cancels the aliasing noise component.

The receiver according to still another aspect of the present invention includes a signal generating unit that generates, from an input signal, a first down-sampled signal at a frequency at which aliasing occurs and a second down-sampled signal at a frequency equal to or higher than a frequency band of an aliasing noise component, a Fourier transform unit that Fourier-transforms the first down-sampled and the second down-sampled signal, and a noise canceling unit that performs an operation with outputs of the Fourier-transform unit in a frequency domain, and that thereby cancels the aliasing noise component.

The other objects, features and advantages of the present invention are specifically set forth in or will become apparent from the following detailed descriptions of the invention when read in conjunction with the accompanying drawings.

BEST MODE FOR CARRYING OUT THE INVENTION

Exemplary embodiments of a receiver according to the present invention will be explained in detail with reference to the accompanying drawings. It should be noted that this invention is not limited by the embodiments.

Figure 1:
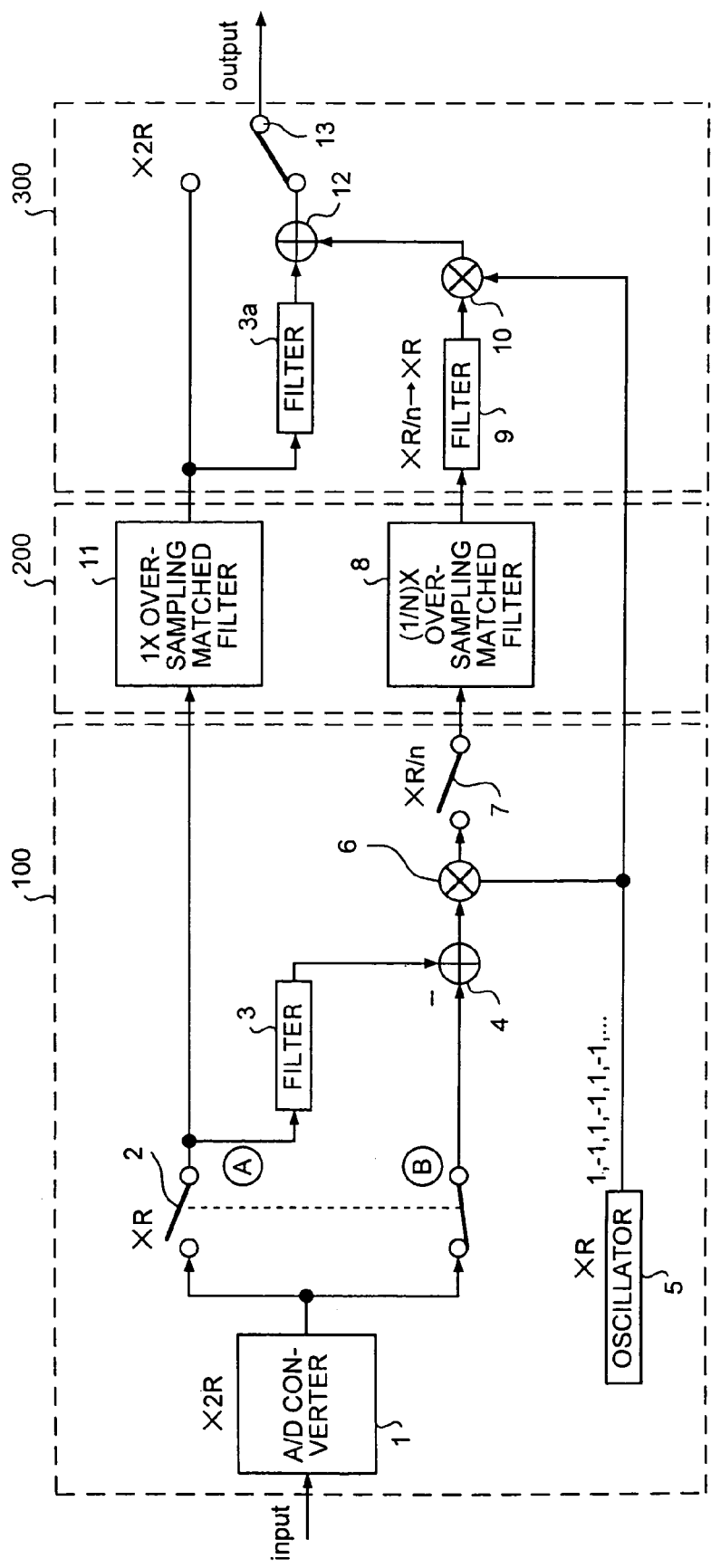
FIG. 1 is a schematic diagram of a spread spectrum receiver according to a first embodiment of the present invention.

FIG. 1 is a schematic diagram of a spread spectrum receiver according to a first embodiment of the present invention. A signal generating/noise extracting unit 100 includes an A/D converter 1, a switch 2, a filter 3, a subtracter 4, an oscillator 5, a multiplier 6, and a switch 7. A dispreading unit 200 includes a (1/n)× over-sampling matched filter 8 and a 1× over-sampling matched filter 11. A noise canceling unit 300 includes a filter 3$a$, a filter 9, a multiplier 10, an adder 12, and a switch 13.

It is assumed that an input signal is a signal in a state in which a spread spectrum signal that is spread with a spreading code at a chip rate R after passing through the roll-off filter having a roll-off factor $\alpha$. It is also assumed that a frequency band of the input signal is $(1+\alpha)R/2$.

The A/D converter 1 samples an input signal at a sampling rate 2R. The switch 2 subjects an output of the A/D converter 1 (at the sampling rate 2R) to serial-to-parallel conversion, and outputs two signals down-sampled at a sampling rate R. Out of the two signals at the sampling rate R, the signal at a point A shown in FIG. 1 is input to the filter 3. An output of the filter 3 is an estimate of the signal at a point B based on the signal at the point A. The subtracter 4 outputs an error (an aliasing noise component) between the point-B signal and its estimate.

This error occurs when sampling the signal in the band of $(1+\alpha)R/2$ at the sampling rate R and converting components at a frequency R/2 or higher back into those at a frequency R/2 or lower. Therefore, the frequency components concentrate in a frequency range of $(1-\alpha)R/2$ to R/2. The multiplier 6 multiplies this error signal by signals output from the oscillator 5 and converts the frequency of the error signal to a frequency near that of a direct current. The output of the oscillator 5 is a repetition of 1, −1, 1, −1, . . . and a sampling rate is R.

The switch 7 samples a frequency-converted output of the multiplier 6 at a sampling rate R/n, where n is a positive integer that satisfies n≦1/a.

The (1/n)× over-sampling matched filter 8 despreads a rate-converted output of the switch 7. The filter 9 converts a sampling rate of the despreading result from R/n to R. The multiplier 10 multiplies a rate-converted output of the filter 9 by the outputs of the oscillator 5 and thereby converts the frequency of the despreading result to about R/2.

Meanwhile, the 1× over-sampling matched filter 11 despreads the signal at the point A. The filter 3$a$ estimates a value at an intermediate point between sample points of the despread signal.

The adder 12 adds up an interpolated output of the filter 33 and a frequency-converted output of the multiplier 10. The switch 13 alternately outputs an output of the 1× over-sampling matched filter 11 and an output of the adder 12, and outputs a despread signal that has been twice over-sampled.

In this embodiment, the receiver is constituted to employ a combination of the 1× over-sampling matched filter and the (1/n)× over-sampling matched filter instead of a two times over-sampling matched filter. By so constituting, small-scale hardware can be mounted on the receiver as compared with the receiver which employs the two times over-sampling matched filter.

Further, the despread output does not include an alias. Therefore, the receiver can exhibit a good reception characteristic as compared with the receiver which employs only the 1× over-sampling matched filter.

If the receiver is used for synchronized detection, the receiver has a good synchronized detection characteristic as compared with the receiver which employs only the 1× over-sampling matched filter. As a result, synchronized detection time and operation time can be shortened, and power consumption can be reduced. Further, differently from the receiver which conducts $(1+1/\alpha)$ times over sampling, the receiver in this embodiment does not have multilevel reference signals spreading codes). Therefore, circuit scale can be greatly reduced.

Although FIG. 1 illustrates that the output of the A/D converter 1 is directly input to the switch 2, the present invention is not limited to this configuration. Even if the receiver is constituted so that another digital processing circuit is interposed between the A/D converter 1 and the switch 2, it is possible to attain the same advantages.

In this embodiment, an instance of converting the analog baseband signal to a digital signal has been explained. Alternatively, IF band over-sampling or IF band under-sampling, for example, may be conducted. If the IF band sampling is conducted, n is determined according to an aliasing caused band to avoid frequency spectrum folding caused by the sampling.

In this embodiment, the receiver is constituted to employ outputs of the 1× over-sampling matched filter 11 and the (1/n)× over-sampling matched filter 8. However, even if the receiver is constituted so that a cyclic integrator is provided after each matched filter, an S/N ratio of each matched filter output signal is improved, and two times over-sampled despread signals are output according to the same procedures as those explained above, it is possible to attain the same advantages.

Figure 2:
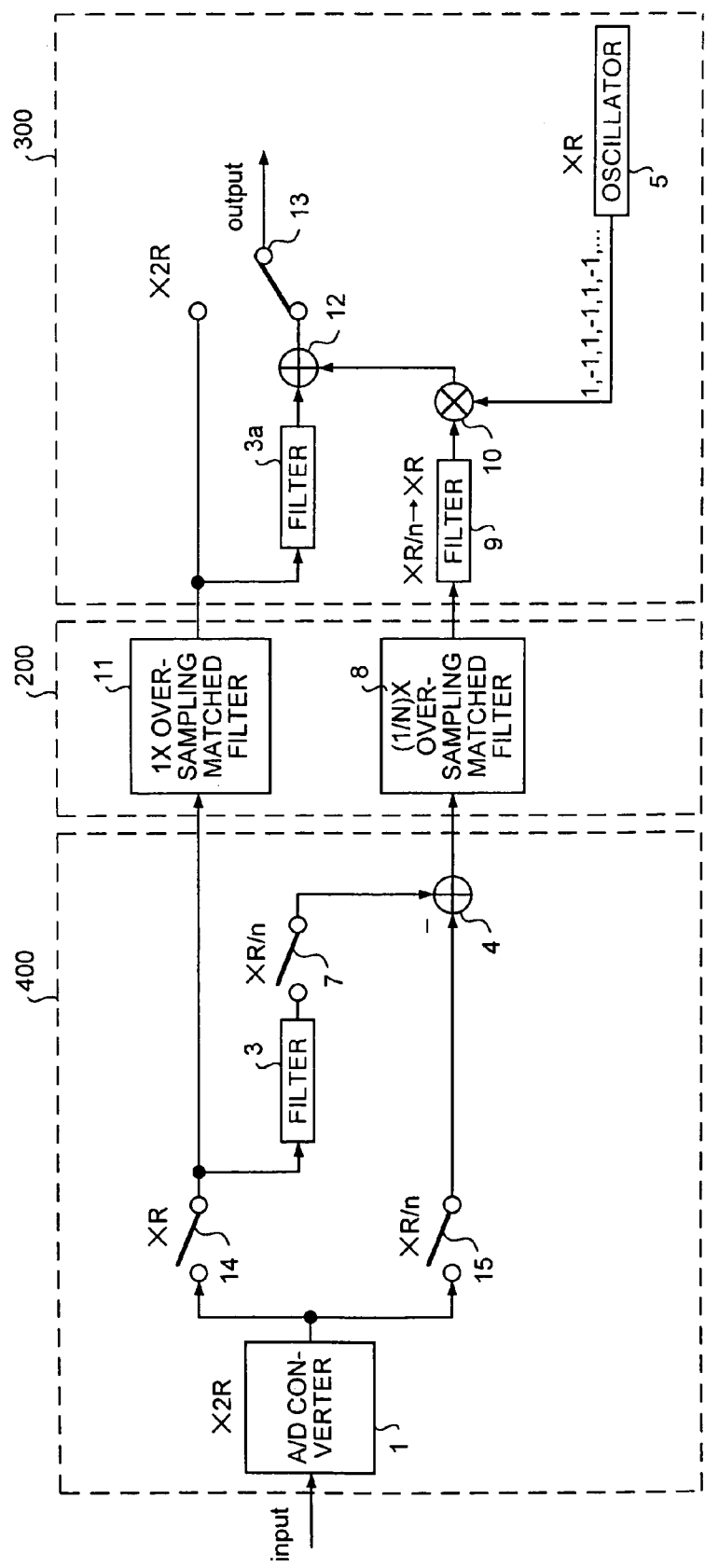
FIG. 2 is a schematic diagram of a spread spectrum receiver according to a second embodiment of the present invention.

FIG. 2 is a schematic diagram of a spread spectrum receiver according to a second embodiment of the present invention. Reference symbols 14 and 15 denote switches. The second embodiment differs from the first embodiment shown in FIG. 1 in three respects in the signal generating/noise extracting unit 400: n is a positive even number; there is only one unit in which an output is multiplied by the output of the oscillator 5, and the operation rate of the subtracter 4 is R/n.

Operations of the second embodiment will be explained. It is noted that only the different operations from those of the first embodiment will be explained herein.

The switch 14 samples a signal, which has been A/D converted at a sampling rate 2R, at a sampling rate R. The switch 15 down-samples the signal, which has been A/D converted at the sampling rate 2R, at a sampling rate R/n. Timings of a rate-converted output of the switch 15 are those at points thinned out by the switch 14.

The filter 3 estimates the points thinned out by the switch 14 based on the rate-converted output of the switch 14.

In this embodiment, n is an even number. Therefore, the output of the switch 7 is always multiplied by the same value and the operation of the receiver can be simplified as follows. The switch 7 samples an estimate output from the filter 3 at the sampling rate R/n. The subtracter 4 calculates the output of the switch 15 and that of the switch 7 after the sampling rate is converted to R/n. Since n is an even number, the multiplier 6 can be omitted and the operation rate of the subtracter 4 lowers to R/n.

The 1× over-sampling matched filter 11 despreads the signal output from the switch 14.

As can be seen, in the second embodiment, the operation rate of the subtracter is as low as R/n and the number of units that multiply an output by the output of the oscillator decreases to one, as compared with the first embodiment. Consequently, it is possible to attain the same advantages as those of the first embodiment and to further miniaturize the reception circuits and further reduce power consumption.

Although FIG. 2 illustrates that the output of the A/D converter 1 is directly input to the switch 14, the present invention is not limited to this configuration. Even if the receiver is constituted so that another digital processing circuit is interposed between the A/D converter 1 and the switch 14, it is possible to attain the same advantages.

In this embodiment, the receiver is constituted to employ outputs of the 1× over-sampling matched filter 11 and the (1/n)× over-sampling matched filter 8. However, even if the receiver is constituted so that a cyclic integrator is provided after each matched filter, an S/N ratio of each matched filter output signal is improved, and two times over-sampled despread signals are output according to the same procedures as those explained above, it is possible to attain the same advantages.

Figure 3:
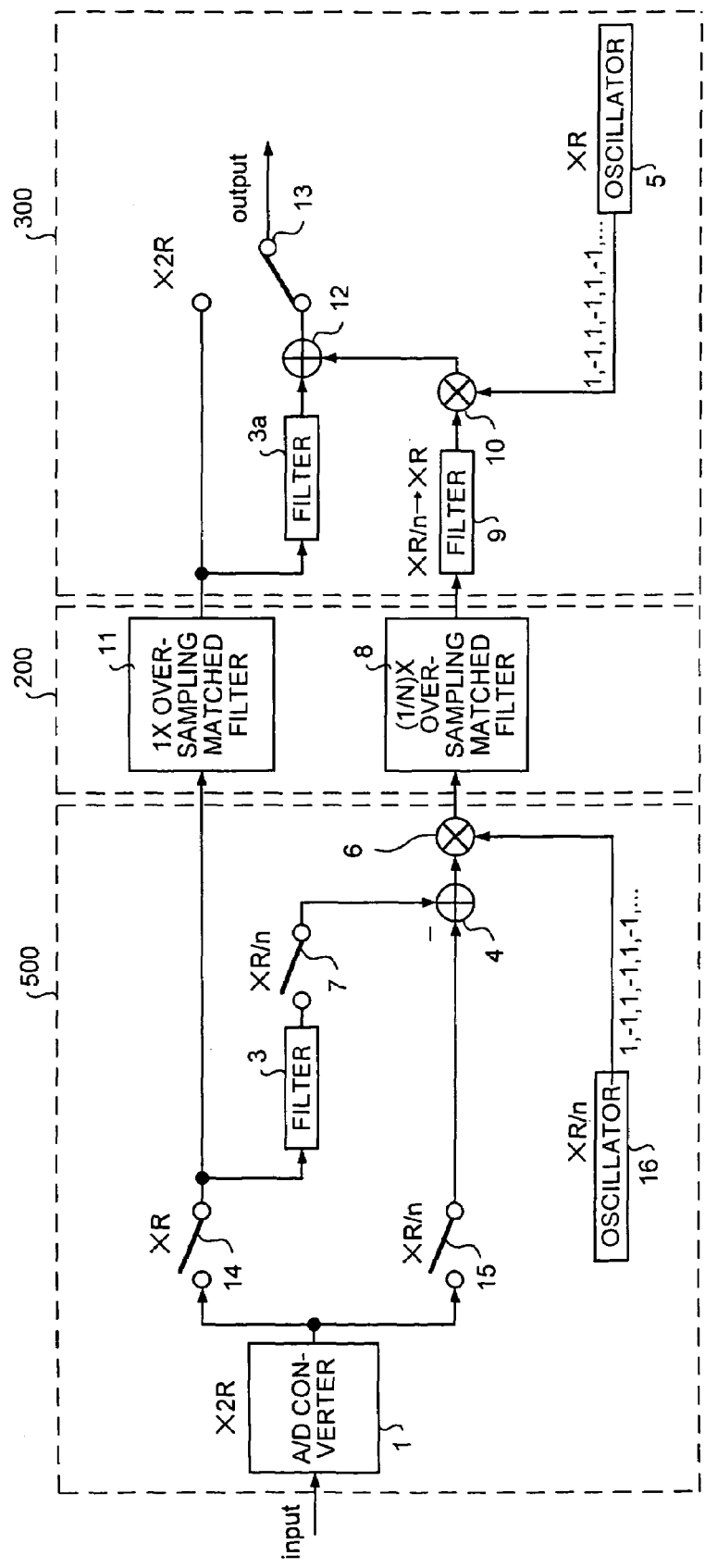
FIG. 3 is a schematic diagram a spread spectrum receiver according to a third embodiment of the present invention.

FIG. 3 is a schematic diagram a spread spectrum receiver according to a third embodiment of the present invention. Reference symbol 16 denotes an oscillator. The third embodiment differs from the second embodiment in three points in the signal generating/noise extracting unit 500: n is a positive odd number; the operation rate of the oscillator is R/n; and a multiplier 6 is employed.

Operations of the third embodiment will be explained. It is noted that only the different operations from those of the first and second embodiments will be explained herein.

In this embodiment, n is an odd number; therefore, the output of the switch 7 can be simplified as follows. The switch 7 samples an output of the filter 3 at a sampling rate R/n. The subtracter 4 calculates the difference between the rate-converted outputs of the switches 15 and 7. The multiplier 6 multiplies an error signal by signals output from the oscillator 6. Since n is an odd number, the multiplier 6 can be arranged at a location having the sampling rate R/n. In addition, the operation rate of the subtracter 4 can be set as low as R/n.

As can be seen, in this embodiment, the operation rates of the subtracter 4, the multiplier 6, and the oscillator 16 are all R/n, which is lower than that in the first embodiment. This can further miniaturize circuits and further reduce power consumption.

Figure 4:
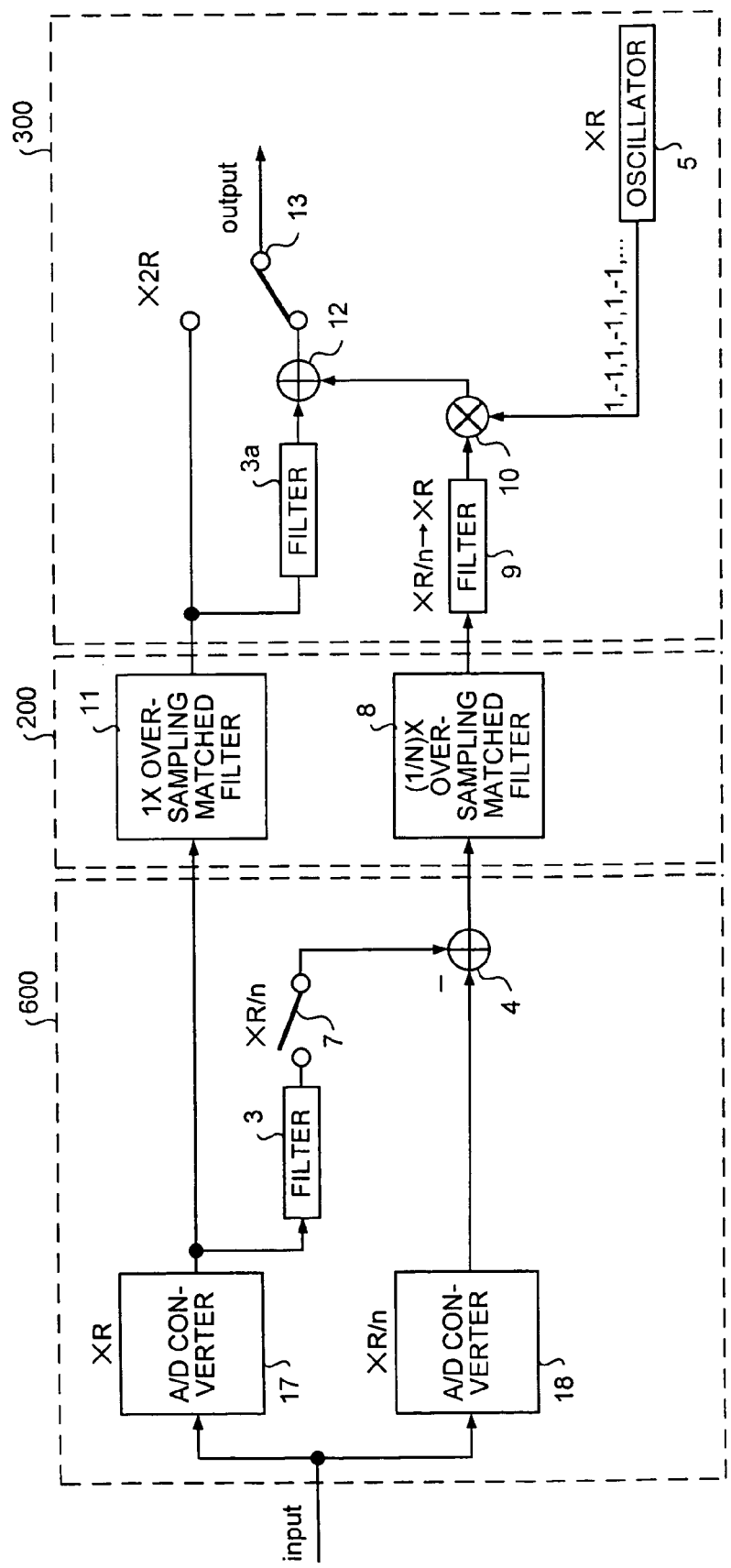
FIG. 4 is a schematic diagram of a spread spectrum receiver according to a fourth embodiment of the present invention.

FIG. 4 is a schematic diagram of a spread spectrum receiver according to a fourth embodiment of the present invention. Reference symbols 17 and 18 denote A/D converters. The fourth embodiment differs from the second embodiment in that two A/D converters having sampling rates R and R/n, respectively, are employed in the signal generating/noise extracting unit 600.

Operations of the fourth embodiment will be explained. It is noted that only the different operations from those of the first, second, and third embodiments will be explained herein.

The A/D converter 17 samples an input signal at the sampling rate R. The A/D converter 18 samples an input signal at the sampling rate R/n. However, the A/D converter 18 performs sampling so that each sample point is an intermediate between the sample points of the A/D converter 17. The filter 3 receives the signal that has been A/D converted at the sampling rate R, and estimates a value at an intermediate between the adjacent sample points.

As can be seen, in this embodiment, the receiver is constituted to employ the two A/D converters having the sampling rates R and R/n, respectively, without employing the A/D converter having the sampling rate 2R. It is thereby possible to attain the same advantages as those of the second embodiment and further miniaturize circuits.

Further, since the sampling rates of the A/D converters are R and R/n, the operation rate of the A/D converters is low, as compared with the A/D converter having the sampling rate 2R. Thus, power consumption can be further reduced.

The instance in which n is an even number has been explained in this embodiment. If n is an odd number, the configuration of the third embodiment can be applied.

Figure 5:
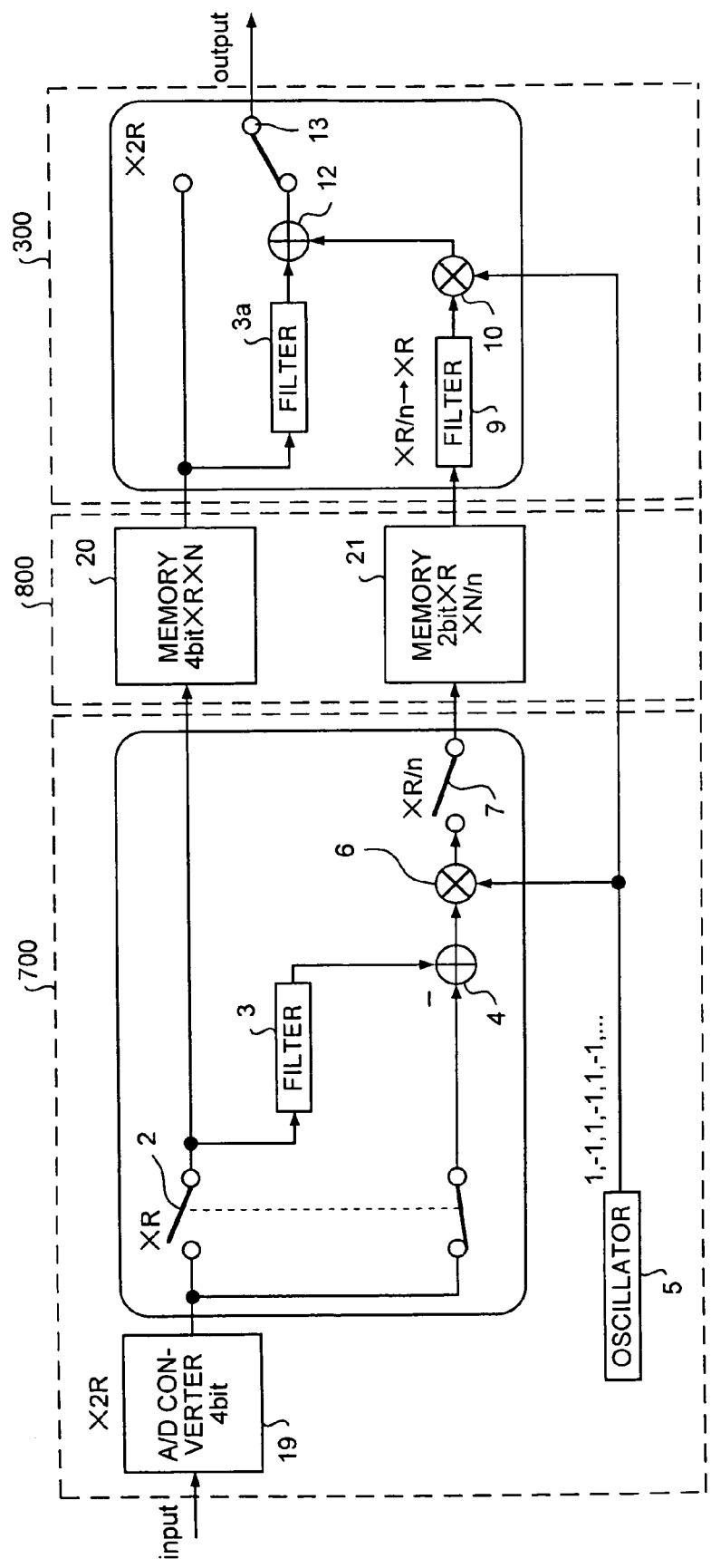
FIG. 5 is a schematic diagram of a spread spectrum receiver according to a fifth embodiment of the present invention.

FIG. 5 is a schematic diagram of a spread spectrum receiver according to a fifth embodiment of the present invention. The signal generating/noise extracting unit 700 includes a 4-bit A/D converter 1$a$ and memories 20, 22. The fifth embodiment differs from the first embodiment in that the matched filters are replaced by memories in a storing unit 800.

Operations of the fifth embodiment will be explained. It is noted that only the different operations from those of the first embodiment will be explained herein. In addition, it is assumed in this embodiment that the receiver includes a circuit which subjects an input signal to four-bit A/D conversion and which stores the converted signal in a 2×R×N memory.

Figure 6:
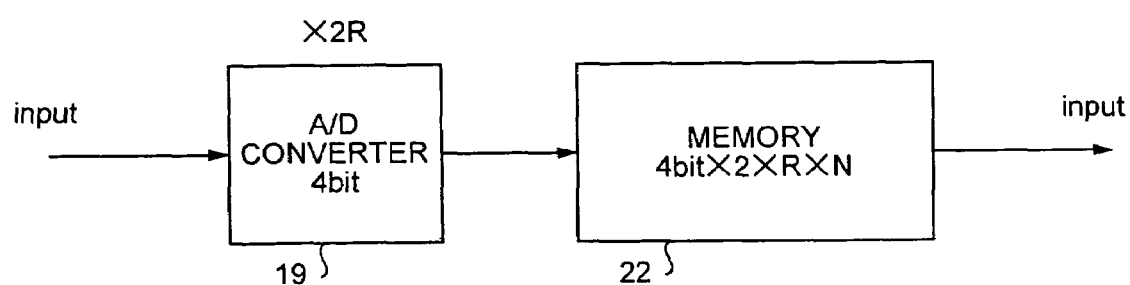
FIG. 6 is a block diagram of an example of a storage circuit.

FIG. 6 illustrates one example of a storage circuit. In FIG. 6, reference symbol 22 denotes a memory. In this case, a memory capacity of 4×2×R×N bits is necessary. On the other hand, if circuits shown in FIG. 5 are employed, a storage circuit equivalent to that shown in FIG. 6 can be realized without decreasing quantity of information.

This embodiment will be explained concretely with reference to FIG. 5. The A/D converter 19 converts an analog input signal to a digital signal at a sampling rate 2R and at a quantization bit rate of four.

The signal at a point A is input to the memory 20 whereas an output of the switch 7 is input to the memory 21. The signal input to the memory 21 indicates an aliasing error component and the signal is normally lower in level than the input signal. Therefore, a bit rate per sample of the memory 21 is lower than that of the memory 20. By way of example, in FIG. 5, the bit rate per sample of the memory 21 is two. Therefore, the memory capacity of the receiver shown in FIG. 5 is 4×R×N+2×R×N/n [bit]. Namely, at n=4, the memory capacity is 4.5RN [bit]. Since the memory capacity of the memory shown in FIG. 6 is 8RN, the memory capacity of the memories shown in FIG. 5 can be reduced to almost half the capacity of the memory shown in FIG. 6.

The filter 9 converts the sampling rate R/n of the signal read from the memory 21 to R. The filter 3a estimates a value at an intermediate between the adjacent sample points of data read from the memory 20.

As can be seen, in this embodiment, the receiver is constituted to employ a combination of the 1× over-sampling memory and the (1/n)× over-sampling memory instead of the two times over-sampling memory. This can thereby considerably reduce the memory capacity.

With the configuration of this embodiment in which the receiver includes the two memories, if n is either even or odd, circuits can be simplified as explained in the second or third embodiment.

The configuration of this embodiment is not limited to that explained above. Even if a band-limited digital signal is transmitted and the number of samples to be transmitted is to be decreased down to a limit that satisfies the sampling theory, the receiver can be realized without complicating the circuits. For example, the invention may be applied to an instance of reducing a transmission capacity for transmission from an A/D converter to each modem (the number of wirings) in an environment, such as a base station, in which many modems are used in parallel.

Figure 7:
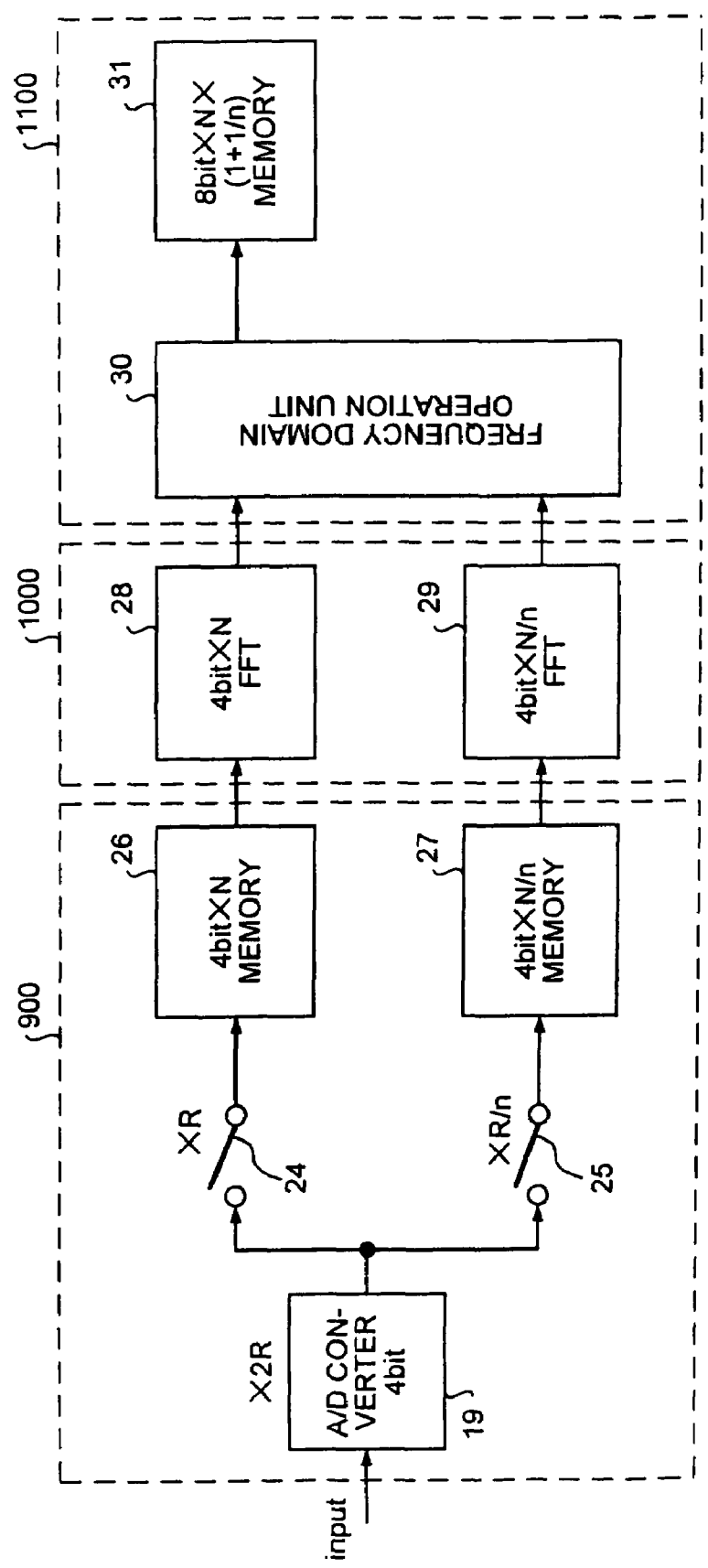
FIG. 7 is a schematic diagram of a spread spectrum receiver according to a sixth embodiment of the present invention.

FIG. 7 is a schematic diagram of a spread spectrum receiver according to a sixth embodiment of the present invention. A signal generating/noise extracting unit 900 includes switches 24, 25, and memories 26, 27. The dispreading unit 1000 includes FFT operation units 28, 29. The noise canceling unit 1100 includes an on-frequency-axis operation processing unit 30, and a memory 31.

Operations of the sixth embodiment will be explained. It is noted that only the different operations from those of the first to fifth embodiments will be explained herein. A frequency band of an input signal is limited to $(1+\alpha)R/2$ or lower, where $0 \leq \alpha \leq 1$. In this embodiment, it is assumed that the receiver includes circuits which subject the input signal to four-bit A/D conversion and a 2×N FFT processing and which stores the results in a memory.

Figure 8:
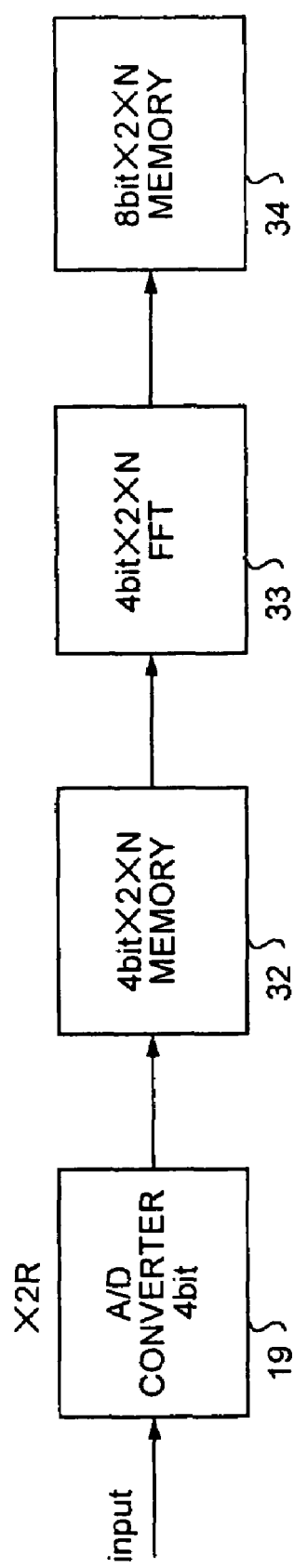
FIG. 8 is a block diagram of an example of a circuit typically used in multicarrier CDMA or OFDM.
Figure 9:
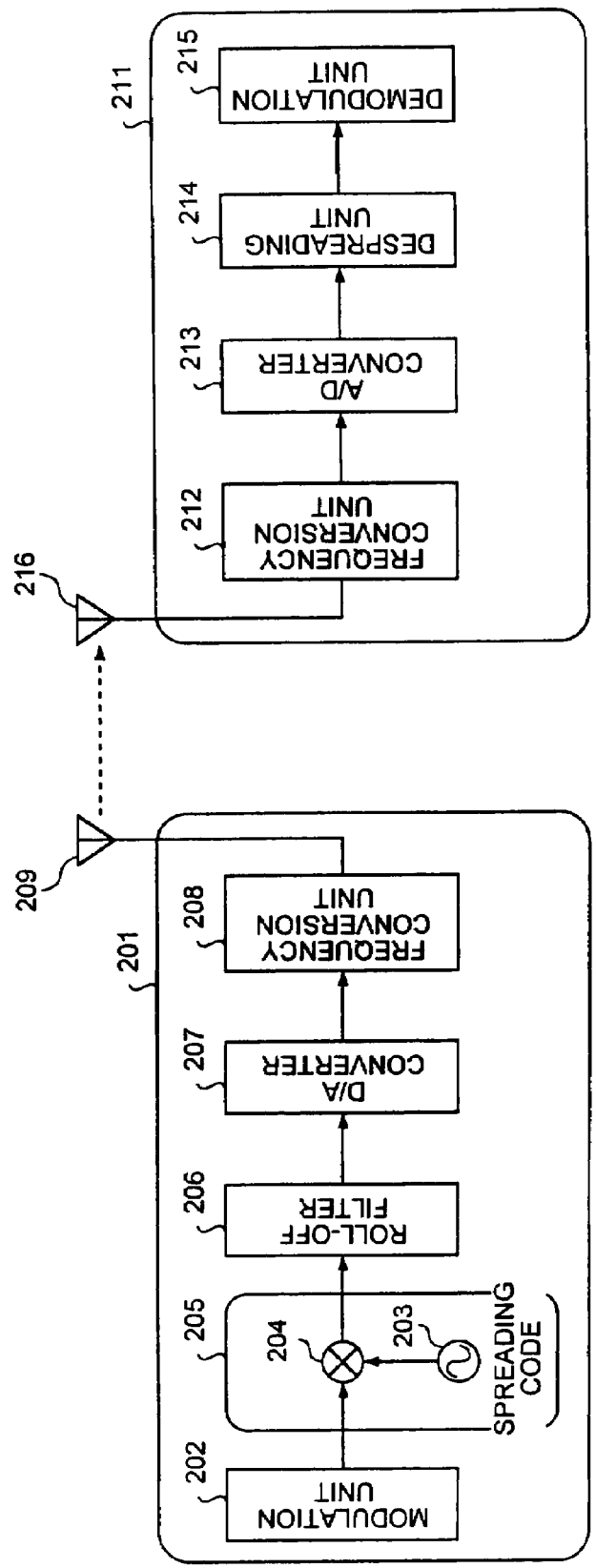
FIG. 9 is a schematic diagram of a conventional spread spectrum receiver.
Figure 10:
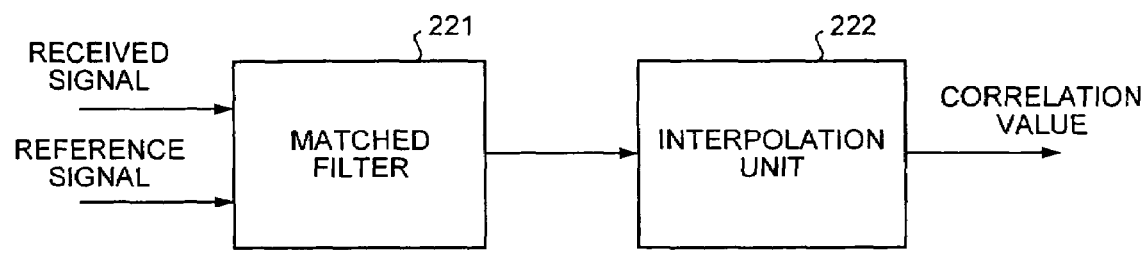
FIG. 10 is a block diagram of a despreading unit.

These circuits are normally employed for multicarrier CDMA, OFDM (orthogonal frequency division multiplex) or the like. FIG. 8 illustrates one example of the circuits normally employed for the multicarrier CDMA or OFDM. In FIG. 8, reference symbol 32 denotes a memory, 33 an FFT operation unit and 34 a memory. A memory capacity of (4+8)×2×N bits for a total of input and output is necessary.

Operations of the receiver will be explained concretely with reference to FIG. 7. The A/D converter 19 converts an input signal from an analog signal to a digital signal at a sampling rate 2R and a quantization bit rate of four.

The switch 24 converts the sampling rate of the A/D converted signal to R. The switch 25 converts the sampling rate of the A/D converted signal to R/n. It is noted, however, that the switch 25 operates so that timings of a rate-converted output of the switch 25 are those at points thinned out by the switch 24. The memories 26 and 27 store outputs of the switches 24 and 26 at N sample intervals and N/n sample intervals, respectively. It is assumed that n is a positive integer that satisfies $\leq N1/\alpha$. For example, FIG. 8 illustrates circuits that realize 1024-point FFT. At $\alpha=0.22$, N=512, n=4, and N/n=128.

FFT operation units 28 and 29 read contents of the memories 26 and 27 and transform read data to frequency regions, respectively. An on-frequency-axis operation processing unit 30 performs a cancellation processing for an error caused by aliasing on a frequency axis. An error-cancelled output of the on-frequency-axis operation processing unit is stored in a memory 31.

As can be seen, in this embodiment, the receiver is constituted to employ the N-point FFT and the N/n-point FFT in place of the 2×N-point FFT. It is thereby possible to decrease a use quantity of the memory. It is also possible to reduce an FFT operation quantity and power consumption.

As explained so far, the receiver according to the present invention is constituted to employ, as a despreading unit, a combination of, for example, the 1× over-sampling matched filter and the (1/n)× over-sampling matched filter. This advantageously enables mounting small-scale hardware as compared with the receiver that employs the two times over-sampling matched filter. If the combination of filters is employed, the output of the receiver does not include an alias. Therefore, as compared with the receiver that employs, for example, only the 1× over-sampling matched filter, the receiver can advantageously exhibit a good reception characteristic. If the receiver is used for synchronized detection, for example, the receiver exhibits a good synchronized detection characteristic as compared with the receiver that employs only the 1× over-sampling matched filter. Therefore, it is advantageously possible to shorten synchronized detection time, shorten operation time, and reduce power consumption.

According to the next invention, the receiver is constituted to estimate, from one of the two down-sampled signals, the other down-sampled signal and to calculate a difference between the other down-sampled signal out of the two down-sampled signals and the estimated down-sampled signal. Therefore, the receiver can advantageously extract the aliasing noise component with a simple configuration.

According to the next invention, the receiver is constituted so that a noise sampling unit samples a received signal at a frequency equal to or higher than a frequency band of the aliasing noise component. This can decrease the operation ratio and, therefore, advantageously reduce power consumption.

According to the next invention, the operation rate of the noise extraction unit is further decreased. Therefore, it is advantageously possible to further reduce circuit scale and further reduce power consumption.

According to the next invention, the receiver is constituted to employ the first A/D converting unit that samples the input signal at a frequency at which aliasing does not occur and the second A/D converting unit that samples the input signal at a frequency equal to or higher than a frequency band of the aliasing noise component in placed of the A/D converter that samples the input signal at the frequency at which the aliasing does not occur. This can advantageously, further reduce circuit scale. In addition, the sampling rate of the units is lower than that of the A/D converter which samples the input signal at the frequency at which the aliasing does not occur. Therefore, it is advantageously possible to lower the operation rate of the A/D converter and further reduce power consumption.

According to the next invention, the receiver is constituted to estimate sample points at intermediate times between adjacent sample points of the despread, down-sampled signal. The receiver converts the frequency of the despread aliasing noise component to a higher frequency. Further, the receiver adds up the interpolated signal and the frequency-converted signal. Therefore, it is advantageously possible to cancel the aliasing noise component with a simple configuration.

According to the next invention, the receiver is constituted to employ, as a storage unit, a combination of a 1× over-sampling memory and a (1/n)× over-sampling memory, for example. Therefore, as compared with the receiver that employs the two times over-sampling memory, the receiver can advantageously, greatly reduce a memory capacity without causing characteristic deterioration.

According to the next invention, the receiver is constituted to employ, for example, an N-point FFT and an N/n-point FFT as a Fourier transform unit. Therefore, as compared with the receiver that employs the 2×N-point FFT, the receiver can advantageously reduce a use quantity of a memory without causing characteristic deterioration. In addition, it is advantageously possible to reduce an FFT operation quantity and reduce power consumption.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

INDUSTRIAL APPLICABILITY

As explained above, the receiver according to the present invention is suitable for a spread spectrum radio communication and particularly suitable for an apparatus to prevent characteristic deterioration caused by aliasing.

The invention claimed is:

1. A receiver comprising:
a signal generating/noise extracting unit configured to generate, from an input signal, a down-sampled signal at a frequency at which aliasing occurs, and to generate a signal, separate from the down-sampled signal, representing an aliasing noise component included in the down-sampled signal;
a despreading unit configured to despread the down-sampled signal and the signal representing the aliasing noise component; and
a noise canceling unit configured to combine the down-sampled signal despread and the signal representing the aliasing noise component despread to cancel the aliasing noise component from the down-sampled signal.

2. A receiver comprising:
a signal generating/noise extracting unit configured to generate, from an input signal, a down-sampled signal at a frequency at which aliasing occurs, and to extract an aliasing noise component included in the down-sampled signal;
a despreading unit configured to despread the down-sampled signal and the aliasing noise component; and
a noise canceling unit configured to combine the down-sampled signal despread and the aliasing noise component despread to cancel the aliasing noise component,
wherein the signal generating/noise extracting unit includes,
an A/D converting unit configured to sample the input signal at a frequency at which the aliasing does not occur,
a signal generating unit configured to sample an analog-to-digital converted signal at a frequency at which the aliasing occurs to generate a first down-sampled signal and a second down-sampled signal,
a signal estimating unit configured to estimate a third down-sampled signal based on the first down-sampled signal, and
a noise extracting unit configured to calculate a difference between the second down-sampled signal and the third down-sampled signal to extract the aliasing noise component.

3. The receiver according to claim 2, wherein the signal generating/noise extracting unit further includes:
a low frequency converting unit configured to down-convert frequency of the aliasing noise component; and
a noise sampling unit configured to sample an output from the low frequency converting unit at a frequency equal to or higher than a frequency band of the aliasing noise component.

4. The receiver according to claim 1, wherein the despreading unit includes:
a 1× over-sample matched filter configured to despread the down-sampled signal; and
a (1/n)× over-sample matched filter configured to despread the aliasing noise component,
wherein n is a positive integer greater than zero.

5. The receiver according to claim 1, wherein the noise canceling unit includes:
a sample point estimating unit configured to estimate values of sample points at intermediate times between adjacent sample points of the down-sampled signal despread;
a high frequency converting unit configured to convert frequency of the aliasing noise component despread into the frequency at which the aliasing occurs; and
an adding unit configured to combine the estimated values and values at sample points output from the high frequency converting unit.

6. A receiver comprising:
a signal generating/noise extracting unit configured to generate, from an input signal, a down-sampled signal at a frequency at which aliasing occurs, and to extract an aliasing noise component included in the down-sampled signal;
a despreading unit configured to despread the down-sampled signal and the aliasing noise component; and
a noise canceling unit configured to combine the down-sampled signal despread and the aliasing noise component despread to cancel the aliasing noise component, wherein the signal generating/noise extracting unit includes, an A/D converting unit configured to sample the input signal at a frequency at which the aliasing does not occur, a first signal generating unit configured to sample an analog-to-digital converted signal at a frequency at which the aliasing occurs to generate a first down-sampled signal, a second signal generating unit configured to sample the analog-to-digital converted signal at a frequency equal to or higher than a frequency band of the aliasing noise component to generate a second down-sampled signal, a signal estimating unit configured to estimate a third down-sampled signal based on the first down-sampled signal, and a noise extraction unit configured to calculate a difference between the second down-sampled signal and the third down-sampled signal to extract the aliasing noise component, wherein the second signal generating unit is configured to sample the signal at points thinned out by the first signal generating unit.

7. The receiver according to claim 6, wherein the noise canceling unit includes:

a sample point estimating unit configured to estimate values at sample points at intermediate times between adjacent sample points of the down-sampled signal despread;

a high frequency converting unit configured to convert frequency of the aliasing noise component despread into the frequency at which the aliasing occurs; and an adding unit configured to combine the estimated values and values at sample points output from the high frequency converting unit.

8. A receiver comprising:

a signal generating/noise extracting unit configured to generate, from an input signal, a down-sampled signal at a frequency at which aliasing occurs, and to extract an aliasing noise component included in the down-sampled signal;

a despreading unit configured to despread the down-sampled signal and the aliasing noise component; and a noise canceling unit configured to combine the down-sampled signal despread and the aliasing noise component despread to cancel the aliasing noise component, wherein the signal generating/noise extracting unit includes, a first A/D converting unit configured to sample the input signal at the frequency at which the aliasing occurs to generate a first down-sampled signal, a second A/D converting unit configured to sample the input signal at a frequency equal to or higher than a frequency band of the aliasing noise component to generate a second down-sampled signal, a signal estimating unit configured to estimate a third down-sampled signal based on the first down-sampled signal, and a noise extraction unit configured to calculate a difference between the second down-sampled signal and the third down-sampled signal to extract the aliasing noise component, wherein the second A/D converting unit is configured to sample the input signal at intermediate times of sample points of the first A/D converting unit.

9. The receiver according to claim 8, wherein the noise canceling unit includes:

a sample point estimating unit configured to estimate values at sample points at intermediate times between adjacent sample points of the down-sampled signal despread;

a high frequency converting unit configured to convert frequency of the despread aliasing noise component into the frequency at which the aliasing occurs; and an adding unit configured to combine the estimated values and values at sample points output from the high frequency converting unit.

10. A receiver comprising:

a signal generating/noise extracting unit configured to generate, from an input signal, a down-sampled signal at a frequency at which aliasing occurs, and to generate a signal, separate from the down-sampled signal, representing an aliasing noise component included in the down-sampled signal;

a storing unit configured to temporarily store the down-sampled signal and the signal representing the aliasing noise component; and a noise canceling unit configured to read the down-sampled signal and the signal representing the aliasing noise component from the storing unit and to combine the down-sampled signal and the signal representing the aliasing noise component to cancel the aliasing noise component from the down-sampled signal.

11. A receiver comprising:

a signal generating/noise extracting unit configured to generate, from an input signal, a down-sampled signal at a frequency at which aliasing occurs, and to extract an aliasing noise component included in the down-sampled signal;

a storing unit configured to temporarily store the down-sampled signal and the aliasing noise component; and a noise canceling unit configured to read signals from the storing unit combines the signals to cancel the aliasing noise component, wherein the signal generating/noise extracting unit includes, an A/D converting unit configured to sample the input signal at a frequency at which the aliasing does not occur, a signal generating unit configured to sample an analog-to-digital-converted signal at a frequency at which the aliasing occurs to generate a first down-sampled signal and a second down-sampled signal;

a signal estimating unit configured to estimate a third down-sampled signal based on the first down-sampled signal; and a noise extracting unit configured to calculate a difference between the second down-sampled signal and the third down-sampled signal extract the aliasing noise component.

12. The receiver according to claim 11, wherein the signal generating/noise extracting unit further includes:

a low frequency converting unit configured to down-convert frequency of the aliasing noise component; and a noise sampling unit configured to sample an output from the low frequency converting unit at a frequency equal to or higher than a frequency band of the aliasing noise component.

13. The receiver according to claim 10, wherein the noise canceling unit includes:

a sample point estimating unit configured to estimate values of sample points at intermediate times between adjacent sample points of the down-sampled signal despread;

a high frequency converting unit configured to convert frequency of the aliasing noise component despread into the frequency at which the aliasing occurs; and an adding unit configured to combine the estimated values and values at sample points output from the high frequency converting unit.

14. A receiver comprising:

a signal generating unit configured to generate, from an input signal, a first down-sampled signal at a frequency at which aliasing occurs and a second down-sampled signal at a frequency equal to or higher than a frequency band of an aliasing noise component;

a Fourier transform unit configured to Fourier-transform the first down-sampled signal and the second down-sampled signal; and a noise canceling unit configured to perform an operation with outputs of the Fourier-transform unit in a frequency domain to cancel the aliasing noise component.

15. A receiver comprising:

a signal generating unit configured to generate, from an input signal, a first down-sampled signal at a frequency at which aliasing occurs and a second down-sampled signal at a frequency equal to or higher than a frequency band of an aliasing noise component;

a Fourier transform unit configured to Fourier-transform the first down-sampled signal and the second down-sampled signal; and a noise canceling unit configured to perform an operation with outputs of the Fourier-transform unit in a frequency domain to cancel the aliasing noise component, wherein the signal generating/noise extracting unit includes, an A/D converting unit configured to sample the input signal at a frequency at which the aliasing does not occur;

a first signal generating unit configured to sample an analog-to-digital converted signal at a frequency at which the aliasing occurs to generate a first down-sampled signal;

a second signal generating unit configured to sample the analog-to-digital converted signal at a frequency equal to or higher than a frequency band of the aliasing noise component to generate a second down-sampled signal; and a memory unit configured to store outputs from the first signal generating unit and the second signal generating unit, wherein the second signal generating is configured to sample the signal at points thinned out by the first signal generating unit.

16. The receiver according to claim 14, wherein the noise canceling unit includes:

a frequency domain operation unit configured to perform an error canceling process on a frequency domain; and a memory unit configured to store an output from the frequency domain operation unit.

* * * * *